(12) United States Patent
Cucerzan et al.

(10) Patent No.: US 8,819,047 B2
(45) Date of Patent: Aug. 26, 2014

(54) FACT VERIFICATION ENGINE

(75) Inventors: Silviu-Petru Cucerzan, Redmond, WA (US); Chee Wee Leong, Denton, TX (US)

(73) Assignee: Microsoft Corporation, Redmond, WA (US)

( * ) Notice: Subject to any disclaimer, the term of this patent is extended or adjusted under 35 U.S.C. 154(b) by 84 days.

(21) Appl. No.: 13/438,846

(22) Filed: Apr. 4, 2012

(65) Prior Publication Data

US 2013/0268519 A1    Oct. 10, 2013

(51) Int. Cl.
G06F 17/30    (2006.01)

(52) U.S. Cl.
USPC ........... 707/761; 707/706; 707/707; 707/723; 707/737; 707/748; 707/749; 707/759

(58) Field of Classification Search
USPC ......... 707/706, 707, 723, 737, 748, 749, 759, 707/761
See application file for complete search history.

(56) References Cited

U.S. PATENT DOCUMENTS

| | | |
|---|---|---|
| 7,587,387 B2 | 9/2009 | Hogue |
| 7,769,579 B2 | 8/2010 | Zhao et al. |
| 7,774,328 B2 | 8/2010 | Hogue et al. |
| 7,966,291 B1 | 6/2011 | Petrovic et al. |
| 7,984,032 B2 | 7/2011 | Thione et al. |
| 8,185,448 B1 * | 5/2012 | Myslinski .................... 705/26.1 |
| 8,224,802 B2 * | 7/2012 | Hogue .......................... 707/706 |
| 2004/0122846 A1 | 6/2004 | Chess et al. |
| 2008/0005075 A1 | 1/2008 | Horvitz et al. |

OTHER PUBLICATIONS

"Machine Learning for Coreference Resolution: Recent Developments", Yimeng Zhang et al., Nov. 21, 2007.*
Thus, at the time invention was made, it would have been obvious to a person of ordinary skill in the art to include the teaching of Zhai in the system of Myslinski. The motivation would be obvious because on of ordinary skill in the art would be able to detect and track untrusted information and sources, especially in presence of contradictory evi.*
"Modeling and Predicting Trustworthiness of Online Textual Information" Ph.D. Thesis Proposal, V.G Vinod Vydiswaran University of Illinois at Urbana—Champaign Department of Computer Science, ChengXiang Zhai et al., Dec. 5, 2011.*
Bendersky, M. et al.; "Discovering Key Concepts in Verbose Queries"; Proceedings of SIGIR; 2008; pp. 491-498.
Bendersky, M. et al.; "Analysis of Long Queries in a Large Scal Search Log"; Proceedings of WSCD; 2009; pp. 8-14.
Blei, D. et al.; "A Correlated Topic Model of *Science*; "; The Annals of Applied Statistics; vol. 1, No. 1; 2007; pp. 17-35.
Brill, E. et al.; "Data-intensive Question Answering"; Proceedings of TREC; 2001; pp. 393-400.

(Continued)

*Primary Examiner* — Etienne LeRoux
*Assistant Examiner* — Cindy Nguyen
(74) *Attorney, Agent, or Firm* — Steve Wight; Carole Boelitz; Micky Minhas

(57) ABSTRACT

The described implementations relate to processing of electronic data. One implementation is manifested as a technique that can include receiving an input statement that includes a plurality of terms. The technique can also include providing, in response to the input statement, ranked supporting documents that support the input statement or ranked contradicting results that contradict the input statement.

20 Claims, 7 Drawing Sheets

(56) References Cited

OTHER PUBLICATIONS

Brin, S. et al.; "The Anatomy of a Large-Scale Hypertextual Web Search Engine"; Computer Networks and ISDN Systems; vol. 30, Issues 1-7; Apr. 1998; pp. 107-117.

Burges, C.; "From RankNet to LambdaRank to LambdaMART: An Overview"; Microsoft Technical Report MSR-TR-2010-82; 2010; 19 pages.

Csomai, A. et al.; "Linguistically Motivated Features for Enhanced Back-of-the-book Indexing"; Proceedings of ACL; Jun. 2008; pp. 932-940.

Cucerzan, S.; "Large Scale Named Entity Disambiguation Based on Wikipedia Data"; Proceedings of the 2007 Joint Conference on Empirical Methods in Natural Language Processing and Computational Natural Language Learning; Jun. 2007; Prague; pp. 708-716.

Dagan, I. et al.; "The PASCAL Recognising Textual Entailment Challenge", Proceedings of PASCAL RTE Challenge Workshop; 2005.

Etzioni, O. et al.; "Web-Scale Information Extraction in KnowItAll"; Proceedings of WWW; May 17-22, 2004; pp. 100-110.

Gyongyi, Z. et al.; "Combating Web Spam with TrustRank", Proceedings of the 30th VLDB Conference; 2004; Toronto, Canada; pp. 576-587.

Huang, J. et al.; "Analyzing and Evaluating Query Reformulation Strategies in Web Search Logs"; Proceedings of the 18th ACM Conference on Information and Knowledge Management; 2009; New York, NY; pp. 77-86.

Jones, r. et al.; "Generating Query Substitutions"; Proceedings of WWW; 2006; pp. 387-396.

Kouleykov M. et al.; "Tree Edit Distance for Recognizing Textual Entailment"; Proceedings of RANLP; 2005; 6 pages.

Kozareva Z. et al.; "MLEnt: The Machine Learning Entailment Systems of the University of Alicante"; Proceedings of PASCAL RTE Challenge Workshop; 2007; 32 pages.

Kumaran G. et al.; "A Case for Shorter Queries, and Helping Users Create Them"; Proceedings of HLT; 2006; pp. 220-227.

Kumaran G. et al.; "Effective and Efficient User Interaction for Long Queries"; Proceedings of SIGIR; Jul. 20-24, 2008; Singapore; pp. 11-18.

Kumaran, G. et al.; "Reducing Long Queries Using Query Quality Predictors"; Proceedings of SIGIR; Jul. 19-23, 2009; Boston, MA; pp. 564-571.

Landauer T. et al.; "A Solution to Plato's Problem: The Latent Semantic Analysis Theory of Acquisition"; Psychological Review; vol. 104, No. 2; 1997; pp. 211-240.

Lewis, D.D. et al.; "RCV1: A New Benchmark Collection for Text Categorization Research"; Journal of Machine Learning Research 5; 2004; pp. 361-397.

Li, W. et al.; "Pachinko Allocation: Dag-Structured Mixture Models of Topic Correlations"; Proceedings of ICML; 2006; 60 pages.

Leong, C.W. et al.; "Supporting Factual Statements with Evidence from the Web", Proceedings of CIKM 2012; Oct. 29-Nov. 2, 2012; Maui, HI; 10 pages.

Mihalcea, R. et al.; "Toward Communicating Simple Sentences Using Pictorial Representations"; Machine Translation; vol. 22; 2009; pp. 153-173.

Pedersen, T. et al.; "WordNet::Similarity—Measuring the Relatedness of Concepts"; Proceedings of AAAI; 2004; 2 pages.

Ratinov, L. et al.; "Local and Global Algorithms for Disambiguation to Wikipedia"; Proceedings of ACL; 2011; 10 pages.

Snow, R. et al.; "Cheap and Fast—But is it Good? Evaluating Non-expert Annotations for Natural Language Tasks"; Proceedings of the Conference on Empirical Methods in Natural Language Processing; 2008; Stroudsburg, PA, USA, pp. 254-263.

Tatu, M. et al.; COGEX at RTE 3; Proceedings of PASCAL RTE Challenge Workshop; Jun. 2007; Prague; pp. 22-27.

Xue, X, et al.; "Improving Verbose Queries Using Subset Distribution", Proceedings of CIKM, Oct. 26-30, 2010; Toronto, Canada; pp. 1509-1068.

"The Facts Query Window"; Retrieved at <<http://202.127.145.151/siocl/cdbank/WebHelp/xfcmhtml/the_fact.html>>, Retrieved Date Oct. 13, 2011, p. 1.

\* cited by examiner

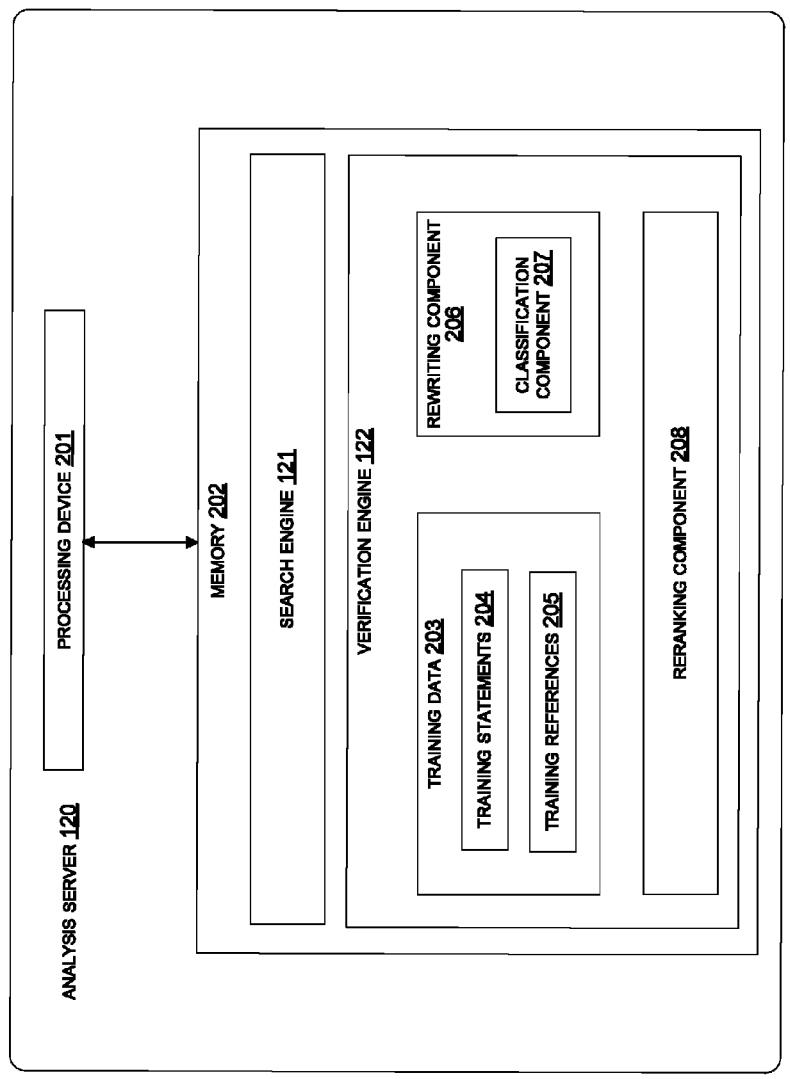

ANNOTATED
DOCUMENT 131(1)

CONTENT PORTION 310

ED SMITH

Ed Smith is generally regarded as one of the most authoritative sources in the world on soybeans.[1] His expertise on soybeans ranges from techniques for growing soybeans in arid environments[2] to creating recipes used in his own restaurant that use soybean oil, soy sauce, or other soy products.[3] Ed Smith graduated from ABC University in 1986.[4] While at ABC, he double-majored in both agriculture and mathematics.[5] His work as an agriculture scientist includes numerous applications of cutting-edge numerical and statistical methods that reflect his mathematical training.[6, 7]

---

[1] "Greatest Living Authorities on Soybeans," March 2007, Legume Times.

[2] Smith, Edward et al., "Techniques Results for Soybean Irrigation," New Mexico Agricultural Review, June 2006.

[3] "Ed Smith, From Agricultural Scientist to Restaurateur," Agricultural Entrepreneur Network, retrieved June 8, 2010.

[4] 1986 ABC University Graduates, retrieved from ABC University homepage on June 8, 2010

[5] Ed Smith personal homepage, retrieved June 8, 2010.

[6] Smith, Edward, "An application of eigenvalue decompositions to soybean pricing models," Journal of Applied Matrix-Based Numerical Methods, February 2008.

[7] Smith, Edward, "Monte-Carlo Integration for Simulating Soybean Yields," Journal of Numerical and Statistical Methods for Agriculture, December 2007.

REFERENCE PORTION 320

FIG. 3

TRAINING DATA 203

<subject> Ed Smith </subject>
<statement> Ed Smith is generally regarded as one of the most authoritative sources in the world on soybeans. </statement>
<ref> http://legumetimes.com/smith </ref>

...

<subject> Ed Smith </subject>
<statement> His work as an agriculture scientists includes numerous applications of cutting-edge numerical and statistical methods that reflect his mathematical training </statement>
<ref> http://agcitenet.edu/JOAMBNM/eigenvalues </ref>
<ref> http://agcitenet.edu/JONASMFA/monte_carlo </ref>

<subject> Finger Tapping </subject>
<statement> This innovative technique came to prominence in the late 70's and early 80's, and was used by many guitarists to create a legato effect </statement>
<ref> http://guitartechniquesandtips.net/tapping </ref>

<subject> Finger Tapping </subject>
<statement> Many amateur guitar players have difficulty keeping time when learning to fingertap, even after they mastered staying in time when soloing using a pick </statement>
<ref> www.guitarrhythmtechniques.net/home </ref>

FIG. 4

601 — John Robinson attended college at XYZ University 1-3 out of 27 supporting results 602
1992 Graduates of XZY
Robinson, John R., BS, Mechanical Engineering
www.xyzuniversity.edu/graduating_classes/92

603
John Robinson – Online Encyclopedia
He attended XYZ University ...
After graduating in 1992,
www.onlinefreeencyclopedia.net/JohnRobinson 604
All About John Robinson
After finishing college in 1986, John moved off of the XYZ university campus ....
www.allaboutJohnrobinson.net

File View Bookmarks Tools History Help http://www.123searchengine.com

601 — John Robinson attended college at XYZ University

700

1-3 out of 27 supporting results    2 of 2 contradicting results

1992 Graduates of XZY  602
Robinson, John R., BS, Mechanical Engineering
www.xyzuniversity.edu/graduating_classes/92

John Robinson – education?  701
i thought John said he'd never been to college?
www.myfavoritetalkforum.net/showthread.php?t=2

John Robinson – Online Encyclopedia  603
He attended XYZ University ...
After graduating in 1992,
www.onlinefreeencyclopedia.net/JohnRobinson John Robinson | Discussion Blog on Puppies and Other Stuff  702
Comment 42:   John doesn't sound educated ...
www.northwestpuppyblog.net/march_2011

All About John Robinson  604
After finishing college in 1986, John moved off of the XYZ university campus ...
www.allaboutJohnrobinson.net

FACT VERIFICATION ENGINE

BACKGROUND

There are many circumstances where it is useful to quickly verify factual information, e.g., politics, media, stock market, retail scenarios, etc. However, users have access to substantial amounts of information from relatively non-authoritative sources such as blogs, forums, discussion groups, social networking sites, etc. Such sources may not be appropriate for verifying factual information. Even relatively authoritative sources such as Wikipedia® can include errors or controversial statements. In some cases, these errors or controversial statements are not annotated with citations to more authoritative sources, and are thus difficult to verify quickly.

One way for a user to verify a particular statement is to use a search engine, e.g., a web search engine such as Bing® or Google®. Web search engines generally receive user queries that include one or more search terms, and respond to the user queries with ranked search results based on the search terms provided in the user queries. For a user attempting to verify a statement, a general web search engine may make the user's task relatively difficult. For example, the user may need to browse through each of the search results to determine whether the individual results tend to support or contradict the statement. Moreover, relatively authoritative sources do not necessarily appear as high-ranked search results, which can make it even more difficult for the user to identify good supporting or contradicting evidence for the statement.

SUMMARY

This document relates to processing electronic data. One implementation is manifested as a technique that can include receiving an input statement that includes a plurality of terms. The technique can also include providing, in response to the input statement, search results including ranked supporting documents that support the input statement or contradicting results that contradict the input statement. At least one of the receiving or the providing can be performed using a computing device.

Another implementation is manifested as a system that can include a verification engine and one or more processing devices configured to execute the verification engine. The verification engine can be configured to receive an input statement and output a query. The verification engine can include training data that includes training statements and training references. The training references can identify supporting documents for the training statements. The verification engine can also include a classification component configured to learn, from the training data, a function that assigns values to terms of the input statement. The verification engine can also include a rewriting component configured to rewrite the input statement based on the values assigned to the terms to obtain the query.

Another implementation is manifested as one or more computer-readable storage media that can include instructions which, when executed by one or more processing devices, can cause the one or more processing devices to perform acts. The acts can include obtaining a plurality of annotated documents, and the annotated documents can include statements and references identifying supporting documents for the statements. The acts can also include extracting training data from the plurality of annotated documents, and the training data can include training paired statements and references. The acts can also include receiving an input statement that includes terms, and rewriting the input statement into at least one query that includes terms from the input statement or terms related to the terms of the input statement. The acts can also include querying a search engine with the at least one query to obtain search results identifying candidate supporting documents for the input statement, re-ranking the search results based on one or more ranking features, and providing the re-ranked search results in response to the input statement.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 2 shows exemplary components of a device in accordance with some implementations of the present concepts.

FIG. 3 shows an exemplary document in accordance with some implementations of the present concepts.

FIG. 4 shows exemplary training data in accordance with some implementations of the present concepts.

FIGS. 6 and 7 show exemplary graphical user interfaces that can be presented in accordance with some implementations of the present concepts.

DETAILED DESCRIPTION

Overview

Figure 1:
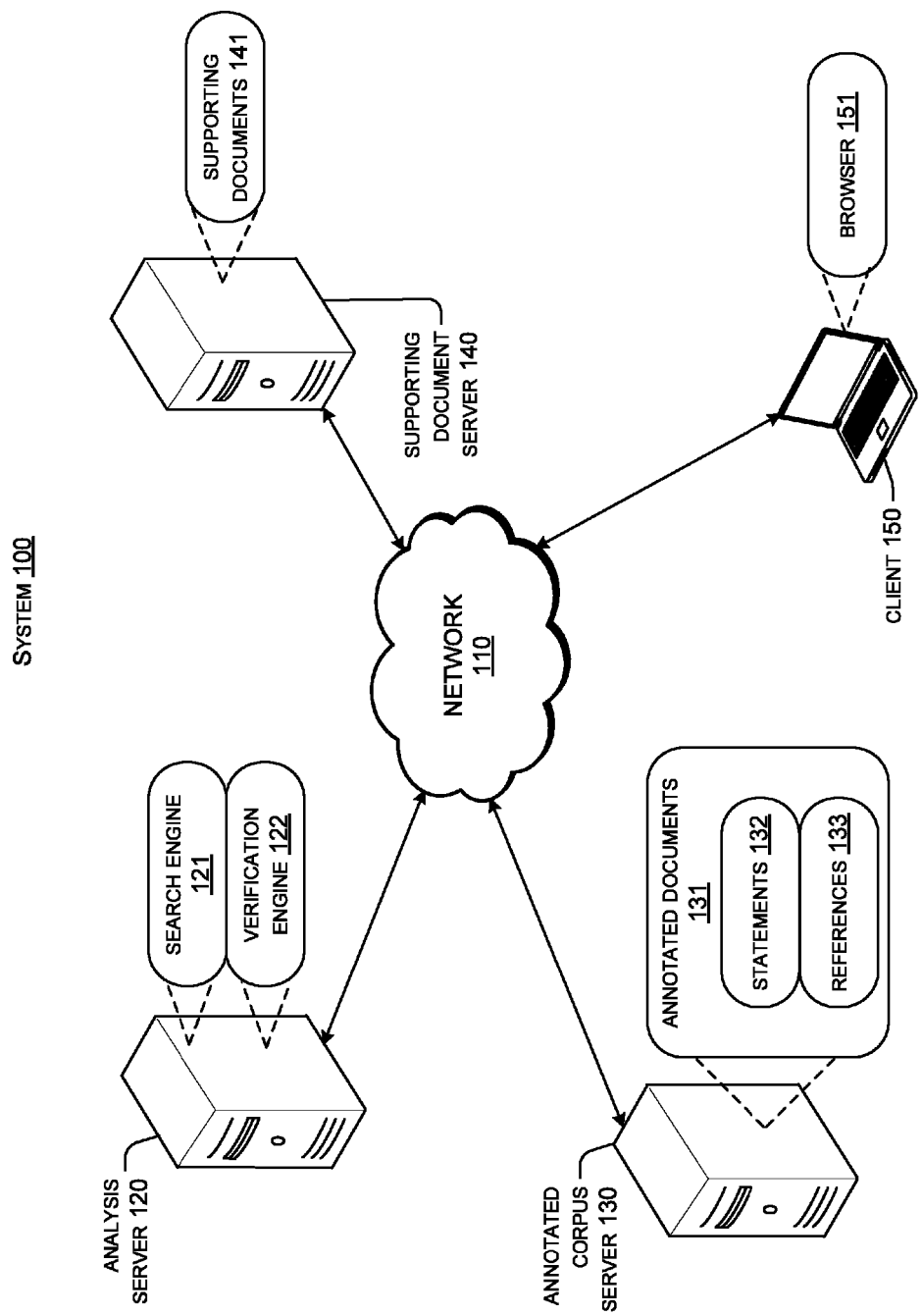
FIG. 1 shows an example of an operating environment in accordance with some implementations of the present concepts.

This document relates to analysis of data, and more particularly to using a verification engine to retrieve supporting and/or contradictory evidence for an input statement. The verification engine can be trained using a corpus of documents having references to other documents, e.g., citations to relatively authoritative sources. For example, the verification engine can be trained using an annotated corpus such as an online encyclopedia (e.g., Wikipedia®). Once the verification engine is trained, the verification engine can receive input, e.g., statements from user queries, and respond to the user queries with results that tend to support or contradict the received statements.

For the purposes of this document, the term "input statement" refers to a statement received as a query, e.g., by a user who would like to receive results that are suitable to support the input statement, or alternatively, to identify documents that contradict the input statement. The term "training statement" refers to statements used to train a classifier used by a verification engine, e.g., statements obtained from an annotated corpus. The term "training reference" identifies a reference that refers to another document, e.g., a citation, paired with the training statement, which cites another document to support the training statement. The term "supporting document" indicates a document that is identified by a reference in an annotated document.

Note also that the terms "training statement" and "training reference" do not necessarily imply that the training statements are annotated with the training references for the purpose of providing training data for a verification engine. Rather, the training statements and training references can be obtained from existing annotated corpora such as the aforementioned online encyclopedia. Thus, in some implementations, existing annotated corpora are used as labeled training data for the verification engine without having to generate training data specifically for the purpose of training the verification engine.

Note that supporting documents do not necessarily include information that would be considered by an objective third party to support the corresponding training statement. Rather, the term "supporting document" as used herein simply indicates that the supporting document is identified by a reference to support the training statement. Thus, the term "supporting document" can also encompass documents that objectively should not have been cited to support a particular training statement. That said, some implementations account for the relative trustworthiness of document sources, as discussed more below.

Generally, the disclosed implementations can rewrite an input statement based on training data that includes both training statements and training references. The input statement can be rewritten as one or more queries to a search engine to retrieve documents that support or contradict the input statement. For example, the input statement can be rewritten by dropping terms from the input statement so that each of the queries can include a subset (e.g., less than all) of the terms from the input statements. The search engine can return ranked results of the queries, and the results can then be re-ranked. The re-ranked results can be provided in response to the input statement.

Example System

For purposes of explanation, consider introductory FIG. 1, which shows an exemplary system 100 that is consistent with the disclosed implementations. As shown in FIG. 1, system 100 includes a network 110 connecting numerous computing devices, such as an analysis server 120, an annotated corpus server 130, a supporting document server 140, and a client device 150. Note that FIG. 1 is representative and that, in practice, there may be multiple instances of each device, e.g., multiple analysis servers, annotated corpus servers, supporting document servers, and/or client devices. As discussed in more detail below, each device 120, 130, 140 and/or 150 shown in FIG. 1 can include one or more processing devices, such as computer processors, executing instructions stored on one or more computer-readable storage media such as a volatile or non-volatile memory, optical disk, hard drive, flash drive, etc.

Analysis server 120 can host a search engine 121, e.g., a computing program or software module that processes queries received from client device 150. Generally speaking, the search engine can respond to the queries with search results that identify one or more matching documents such as web pages or other electronic data items that are hosted by various servers, such as the annotated corpus server 130, the supporting document server 140, or other document servers. The results can be displayed by client device 150 using browser 151, and, in some implementations, the results include links that allow the client device to obtain the documents. For example, the search results can include uniform resource locators (URLs) for each document in the search results.

In some instances, a query received by the search engine 121 can be in the form of a statement, e.g., "John Robinson attended college at XYZ University." In such instances, the search engine can use verification engine 122 to respond to the query. The verification engine can rewrite the query, provide the query to the search engine, receive results from the search engine, and re-rank the results. The search engine can respond to the query with the re-ranked results. Generally speaking, the verification engine rewrites the query and re-ranks the results so that the results that tend to support the statement are ranked more highly than other results. In some implementations, the verification engine also provides another set of results that tend to contradict the statement.

In some implementations, the search engine 121 is configured to detect whether queries to the search engine are in the form of factual statements. For example, probabilistic methods, text entropy (such as per-word entropy), and/or perplexity can used to classify received queries to filter out non-statements. For queries classified as statements, the search engine can provide these queries to the verification engine 122. The search engine can handle the queries that are not classified as statements directly without providing them to the verification engine. In other implementations, the search engine can be a "typical" web search engine, e.g., it is not necessarily configured to detect whether queries are statements. Instead, for example, users can use a particular interface (e.g., at a particular URL) to the verification engine which in turn rewrites queries and provides them to the search engine.

Note that FIG. 1 shows the search engine 121 embodied on the analysis server 120 with the verification engine 122. In some implementations, this can be a convenient arrangement because the search engine can interact with the verification engine (e.g., in a shared memory) to provide search results for particular user queries in the form of statements. However, note also that the processing disclosed herein can be performed by different architectures, e.g., by distributing the disclosed processing across various machines. In some implementations, the verification engine is located on a different device than the search engine. In such implementations, the verification engine can communicate with the search engine over the network rather than being collocated with the verification engine on a single device.

The supporting document server 140 can be any type of device that provides documents such as web servers, email servers, blog servers, etc. Supporting documents 141 refers to documents that are identified by one or more references in annotated documents 131 hosted by the annotated corpus server 130. Note that the supporting document server can also host other documents that are not identified by the references on the annotated corpus server, e.g., documents that are not cited by authors of the annotated documents. For the purposes of the examples provided herein, the supporting document server is discussed in the context of web servers that serve documents such as web pages, scholarly articles, newspaper articles, etc.

The annotated corpus server 130 can be similar to the supporting document server 140, e.g., a web server that serves the annotated documents 131. Note also that the annotated corpus server 130 can also include other documents, e.g., non-annotated documents. Annotated corpus server 130 and supporting document server 140 are shown in FIG. 1 as distinct servers for exemplary purposes only, and it is contemplated that the functions disclosed herein for both the annotated corpus server and supporting document server can also be performed by a single server, distributed across multiple servers, etc.

Generally speaking, the annotated documents include statements 132 paired with references 133. For example, one such statement could be "Ed Smith graduated from ABC University in 1986." The references can be footnotes, endnotes, citations introduced with signals such as "See," "See also," etc. As mentioned above, an online encyclopedia is one example of an annotated corpus suitable for use with the disclosed concepts.

Other examples of annotated corpora include academic journals, law reviews, or other sources where authors tend to substantiate statements made therein with references to external supporting documents. Note that some annotated corpora may contain references identifying contradictory references for a particular statement, e.g., the "But See" citation signal may identify contradictory documents that contradict the particular statement. The techniques described herein with respect to supporting references can also be applied to contradictory references.

Generally speaking, references in the annotated documents 131 tend to support the corresponding statements. For example, a reference for the example statement above could be a citation to a web page that includes some relatively authoritative information indicating Ed Smith did graduate from ABC University in fall 1986. For example, the citation could point to a URL for a roster of graduates at the University for a particular year, e.g., an example URL could be "http://www.abcuniversity.edu/alumni_roster/1986." Other examples of references appropriate to this example statement could be URLs to newspaper articles, biographies, etc.

Example Analysis Server

FIG. 2 shows an exemplary architecture of analysis server 120 that is configured to accomplish the concepts described above and below. The analysis server can include a processing device 201 that is operably connected to a memory 202 via a bus. Processing device 201 can represent, e.g., one or more central processing units, microprocessors, multi-core processors, etc. The processing device can use architectures such as a reduced instruction set computing (RISC) architecture (e.g., ARM or advanced RISC machine) or a complex instruction set computing (CISC) architecture (e.g., x86).

Memory 202 can be a volatile storage device such as a random access memory (RAM), or a non-volatile memory such as FLASH memory. Although not shown in FIG. 2, analysis server 120 can also include various input/output devices, e.g., a keyboard, a mouse, a display, a printer, etc. Furthermore, the analysis server can include one or more non-volatile storage devices, such as a hard disc drive (HDD), optical (compact disc/digital video disc) drive, tape drive, etc. Generally speaking, any data processed by the analysis server can be stored in memory 202, and can also be committed to non-volatile storage.

Memory 202 of analysis server 120 can include various components that implement certain processing described herein. For example, memory 202 can include search engine 121 and verification engine 122. The verification engine can include training data 203, which can include training statements 204 and training references 205. The verification engine can also include subcomponents such as rewriting component 206 and re-ranking component 208. The rewriting component can include a classification component 207.

Generally speaking, the verification engine 122 can be configured to obtain the annotated documents 131 from the annotated corpus server 130 to use as the training data 203. The annotated documents can be processed to identify statements and corresponding references included therein, which can be used by the verification engine as the training statements 204 and the training references 205. The verification engine can be configured to build a retrieval model using the training statements and the training references. The rewriting component 206 can be configured to receive input statements from the search engine 121 and rewrite the queries using the retrieval model. The classification component 207 can be configured to classify terms of the input statements using a classification algorithm or "classifier." The search engine can be configured to execute the rewritten queries and provide results to the re-ranking component 208. The re-ranking component can be configured to re-rank the results, and the search engine can be configured to provide the re-ranked results to a user responsive to the input statement.

Generally speaking, components 121, 122, 206, 207, and 208 can include instructions stored in memory 202 that can be read and executed by processing device 201, and components 203, 204, and 205 can represent stored data. Components 121, 122, and 203-208 can also be stored in non-volatile storage and retrieved to memory 202 to implement the processing described herein. As used herein, the term "computer-readable media" can include transitory and non-transitory instructions. In contrast, the term "computer-readable storage media" excludes transitory instances, and includes volatile or non-volatile hardware memory devices and/or hardware storage devices such as those discussed above with respect to memory 202 and/or other suitable storage technologies, e.g., optical disk, hard drive, flash drive, etc.

In some alternative configurations, the techniques disclosed herein can be implemented on one or more computers that use a system on a chip (SOC) type design. In such a case, functionality provided by various components, e.g., 121, 122, 206, 207, and 208 can be integrated on a single SOC or multiple coupled SOCs. In one such example, individual computers can include shared resources and dedicated resources. One or more interfaces can facilitate communication between the shared resources and the dedicated resources. As the name implies, dedicated resources can be thought of as including individual portions that are dedicated to achieving specific functionalities. Shared resources can be storage, processing devices, etc. that can be used by multiple functionalities.

Example Annotated Document

FIG. 3 shows an example annotated document 131(1), e.g., an individual annotated document that can be hosted by the annotated corpus server 130 (FIG. 1). Annotated document 131(1) will be used for exemplary purposes in the following discussion, but note that the annotated corpus server can include a large number of annotated documents on various topics. Thus, while the training data 203 (FIG. 2) for the verification engine 122 is generally discussed with respect to data obtained from annotated document 131(1), this approach is for exemplary purposes. In practice, the training data can be obtained from multiple annotated documents and can therefore be derived from the broad range of topics available from the annotated corpus server.

In some implementations, the annotated documents 131 can be divided into a content portion 310 and a reference portion 320, e.g., for an annotated document that uses footnotes. FIG. 3 illustrates annotated document 131(1) in such a configuration for convenience, e.g., with numerical footnote identifiers 1-7 in content portion 310 and corresponding footnote references 1-7 located separately in reference portion 320. Note, however, that other annotated documents may have references intermingled with content, e.g., using signal words (See, See Also, etc.). Other documents may use endnotes as references so that the endnote references are all together at the end of a document instead of on a single page as shown in FIG. 3.

As shown in FIG. 3, annotated document 131(1) includes seven references, in this case, footnote citations to various supporting documents 141. The seven references provide support for five statements. The last sentence in the content portion includes two end-of-sentence references (6 and 7), the second sentence includes an in-sentence reference (2) and an end-of-sentence reference, and the remaining sentences include one reference each. Considering the reference portion, the supporting documents for annotated document 131(1) are each identified by the corresponding reference number from the content portion. The underlined portions of the individual references represent anchor text that has a corresponding URL from which the supporting document can be retrieved.

Example Training Data

FIG. 4 illustrates an exemplary format for training data 203. Generally speaking, the verification engine 122 can be configured to extract the training data from the annotated documents 131. In FIG. 4, the training data is shown in a configuration where delimiters (e.g., "tags" such as < >) are used to label different sections of the training data. For example, delimiters may be specified by a particular format (e.g., tab or comma delimited formats) or a computer language used to store the training data, e.g., a markup language such as XML (Extensible Markup Language). Other implementations may use other formats for representing the training data, e.g., database tables, individual data structures such as structures, classes, etc.

As mentioned previously, the verification engine 122 can be configured to identify individual training statements 204 and training references 205 within the annotated documents 131. Generally, these statements and references are stored with labels shown via the delimiters of FIG. 4. In some implementations, the verification engine also identifies a title or subject of the document from which the training statements are obtained. For example, the tags <subject> and </subject> can enclose the subject of the document from which an individual training statement is extracted, the tags <statement> and </statement> can enclose the individual training statement itself, and the tags <ref> and </ref> can enclose one or more corresponding training references used by the author of the document to support the individual training statement.

Thus, considering FIG. 4, the first entry shown in the training data 203 is for the first sentence of annotated document 131(1) from FIG. 3, e.g., "Ed Smith is generally regarded as one of the most authoritative sources in the world on soybeans." The subject entry can be obtained by the verification engine 122 from the title of annotated document 131(1), e.g., "Ed Smith." The ref entry can be obtained by the verification engine from the first footnote in the reference portion of the annotated document. Note that FIG. 3 shows the anchor text "Greatest Living Authorities on Soybeans," but the underlying URL represented by the anchor text is shown in FIG. 4 as http://legumetimes.com/smith. Thus, the verification engine can obtain the supporting document identified by the reference via the URL http://legumetimes.com/smith.

Example Method

Figure 5:
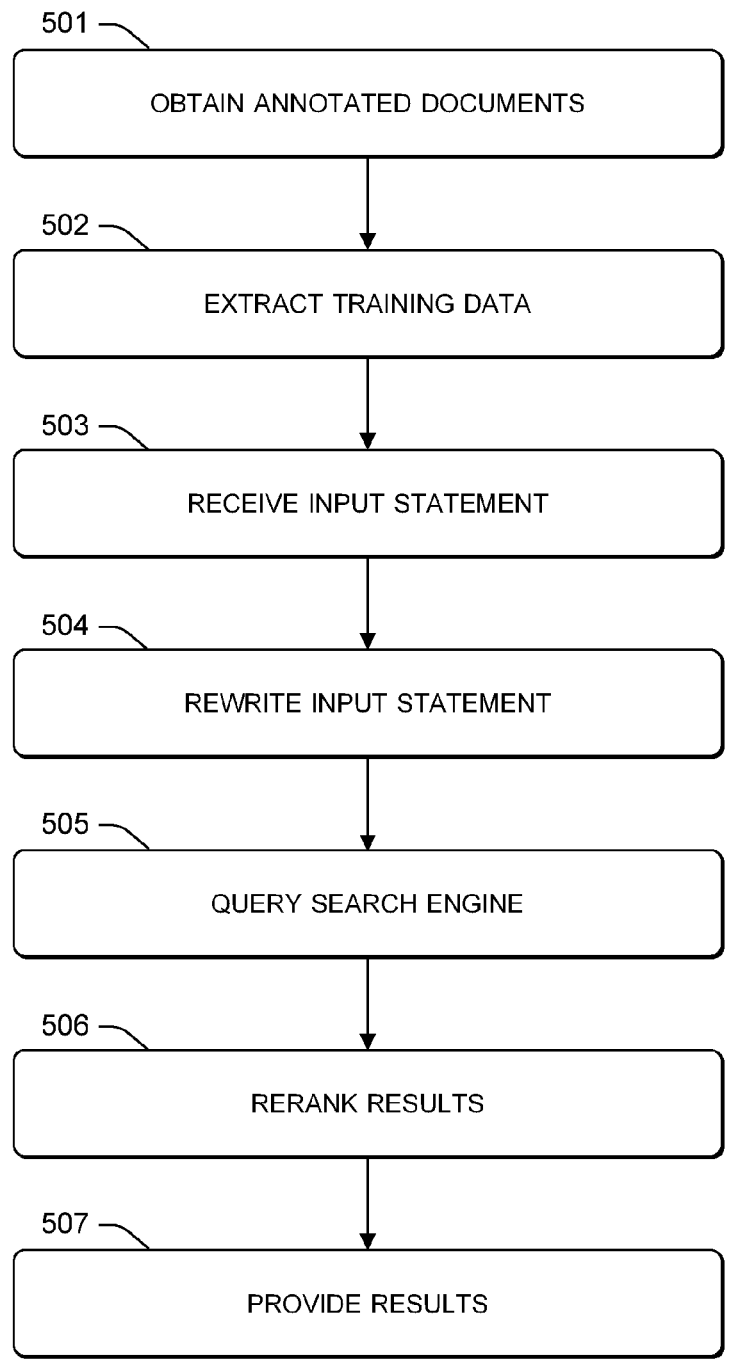
FIG. 5 shows a flowchart of an exemplary method that can be accomplished in accordance with some implementations of the present concepts.

FIG. 5 illustrates a method 500 that is suitable for implementation in system 100 or other systems. The verification engine 122 on the analysis server 120 can implement method 500, as discussed below. Note that method 500 is discussed herein as being implemented on the analysis server for exemplary purposes, but is suitable for implementation on many different types of devices.

Annotated documents 131 can be obtained at block 501. For example, the verification engine 122 can obtain multiple annotated documents from the annotated corpus server 130. Each annotated document can include one or more references to other documents, e.g., the supporting documents 141 hosted on the supporting document server 140. As also mentioned previously, each annotation in the annotated documents can refer to an individual supporting document that the creator of the annotated document uses to support a corresponding statement in the annotated document.

Training data 203 can be extracted at block 502. For example, the verification engine 122 can segment the annotated documents 131 into sentences, e.g., using a sentence breaker. For each sentence, the verification engine can identify any citations within the sentence or at the end of the sentence to one or more of the supporting documents 141 for that sentence. The extracted references and corresponding sentences can be used as the training references 205 and the training statements 204, respectively. As mentioned above, one suitable format for the extracted training statements and references is shown in FIG. 4.

An input statement can be received at block 503. For example, the verification engine 122 can receive the input statement "John Robinson attended college at XYZ University" from the search engine 121. The input statement can be a query that a user submitted to the search engine, e.g., using client device 150. The search engine can provide the statement to the verification engine for further processing. As mentioned above, in some implementations, the search engine analyzes received queries to determine whether the queries are statements and, if so, submits the statements to the verification engine.

The input statement is rewritten at block 504. For example, the rewriting component 206 can identify terms, such as entity names (e.g., Ed Smith, ABC University) or concepts (e.g., arid environments, statistical methods), in the input statement and select a subset of the terms to use as a query to the search engine 121. Viewed from one perspective, the rewriting component selects some terms from the input statement to omit in the rewritten query. In further implementations, the rewriting component can include terms that are related to the terms in the original query, e.g., synonyms, hyponyms or hypernyms of the original query terms. In some implementations, rewriting the input statement includes classifying individual terms included in the query and/or related terms using a classifier that is trained on the training data 203. In further implementations, multiple rewritten queries are obtained from the input statement at block 504.

The search engine 121 is queried at block 505. For example, the verification engine 122 can submit the rewritten query or queries to the search engine. Results can be obtained from the search engine, e.g., results that the search engine matches to the rewritten query or queries. The results can be ranked by the search engine based on their overall relevance to the individual rewritten query or queries. Note that some search results may be retrieved more than once, e.g., by more than one rewritten query. Generally speaking, each search result is an identifier of a candidate supporting document for the input statement.

The results are re-ranked using one or more ranking features at block 506. For example, the re-ranking component 208 can compute one or more similarity measures between the input statement and the candidate supporting documents identified by the search results, and use the similarity measures as ranking features. As mentioned in more detail below, the similarity measures can be heuristics such as cosine similarity, LSA, Kullback-Leibler ("KL") divergence, etc. The candidate supporting documents can be re-ranked by normalizing the similarity measures to generate a combined similarity measure for each candidate supporting document. Generally, documents that are similar to the input statement tend to be ranked more highly than other documents that are less similar to the input statement. The re-ranking component can also take into account other ranking features for source trustworthiness, such as number of times the source provided evidence for statements in a corpus, e.g., a web page ranking algorithm such as PageRank®, the number of times a site or document is employed as a reference in a given corpus, Alexa® web analytics rankings, etc.

Results are provided in response to the input statement at block 507. For example, the verification engine 122 can provide the re-ranked results to the client device. In some implementations, the verification engine provides a subset of the re-ranked results, e.g., a higher-ranking subset that includes a fixed number of relatively high-ranking, e.g., top-ranked results or only results with combined similarity measures exceeding a threshold.

Note that method 500 is not necessarily performed in a serial fashion as discussed above for ease of exposition. For example, blocks 503-507 can be performed repeatedly for each received input statement without revisiting blocks 501 and 502. Blocks 501 and 502 can also be performed multiple times, however, e.g., to update training data 203. For example, over time, additional annotated documents 131 may be added and, in some cases, more rigorous citing requirements may be imposed on authors of the annotated documents. These circumstances can present opportunities to obtain new and possibly higher-quality training data, e.g., if the overall quality of the citations in the annotated documents are improved over time.

Training

The following section describes more detail associated with the training data 203. Generally, the annotated corpus can be viewed as a corpus of factual statements paired with supporting Web documents that can be obtained from the supporting document server 140. Thus, the supporting documents 141 can often be readily retrieved by URLs in the references. Because the training references 205 were chosen by human users to support the corresponding training statements 204, these citations often point to some of the most relevant Web documents for supporting the corresponding statements. Said differently, the annotated corpus can be viewed as a labeled training data set, e.g., statements labeled with supporting references. Lexical matching between paired Web documents and statements can be used to render the statements into bags of semantic terms that can be used for retrieving relevant documents. As discussed more below, the disclosed implementations can provide a semantic term classifier for rewriting factual statements for querying the Web.

In some implementations, the verification engine 122 can parse the annotated documents 131 into sentences. The verification engine can use the sentences as training statements by extracting, for each reference, the whole preceding sentence. When multiple citations are used in support of a statement, multiple training data points can be extracted with the same subject and statement, but different references. Note also that automatic sentence segmentation is not necessarily 100% accurate, and thus, some data points in the training data 203 may have statements that include multiple sentences or sentence fragments.

Note also that the verification engine 122 may use other data in the annotated documents 131 to provide context for the statements extracted from a document. For example, a subject or title of the document can be employed to provide context for statements included therein. This can be useful in order to preserve the original meaning of the statement instead of, e.g., attempting to resolve pronominal references by employing anaphora resolution methods. In some implementations, however, anaphora resolution methods can also be employed for resolving pronouns.

In some implementations, the training references 205 contain URLs that are included in the annotated documents 131 from which the training statements 204 are extracted. For some corpora, not all of the references are to online sources or contain the URL of the source. Thus, in some implementations, only those references that include a well-formed URL are extracted as data points by the training component.

Some implementations may use an entity extractor and disambiguator to extract instances of entity/concept mentions in the text of the annotated documents 131. The training component can segment the text into sentences and extract those sentences that contained citations. These sentences can then be used as the training statements 204.

Viewed from one perspective, the disclosed implementations generate supporting evidence from online sources for an input statement as a specific type of search task. More specifically, the information conveyed in the input statement is used to query the search engine 121 and retrieve documents that entail the input statement. The techniques disclosed herein rely to some extent on the quality of the citations extracted from the annotated documents 131. The citations in the annotated documents may refer to particularly relevant documents that are available (e.g., on the Web) to support the corresponding statements in the annotated document. Although this is not necessarily the case in practice for all annotated corpora, an annotated corpus such as Wikipedia® is sufficiently well-annotated to build a reliable retrieval model. One goal of the disclosed implementations is to learn a retrieval model that, for many of the training statements 203, retrieves the corresponding references as the top-ranked documents. In other words, the retrieval model is constructed so that, given a statement that has been annotated as an input, the retrieval model tends to return the document referenced by the annotation as a relatively high-ranked, e.g., top-ranked document.

One method of obtaining supporting documents for a statement is simply to use the statement directly as a query to the search engine. However, experimental results on annotated corpora indicate that existing search engine algorithms tend not to retrieve referenced documents as relatively high-ranked results when corresponding training statements 204 are submitted directly as queries. Indeed, even if only the terms common to both the statement and the referenced document are used as a query (which can be referred to as an "oracle" query), existing search engine algorithms still tend not to exhibit satisfactory performance at retrieving the referenced document as a highly-ranked search result.

Rewriting Example

The following section discusses some implementations of the rewriting component 206 in more detail. Generally, the rewriting component can be configured to transform a statement into a set of terms that are likely to occur in a document that supports the statement. As mentioned above, the rewriting component can be trained using the training data 203 extracted from an annotated corpus such as Wikipedia®. One consideration is that false positive errors in term prediction tend to result in queries that do not retrieve the supporting document. As discussed more below, queries including terms that do not appear in the supporting document tend not to retrieve the supporting document, e.g., for particular types of search engines. Therefore, some implementations adopt term removal strategies in which a number of terms are dropped from the input statement before being used as a query to the search engine 121. Thus, the rewriting component can be trained to select a subset of the terms in the input statement to use as the rewritten query. The retrieved results can then be provided to the re-ranking component 208 based on text similarity measures with the input statement to determine the relevant document(s) to retrieve for the input statement.

Generally, the meaning of a sentence (or text fragment) is encoded in the meaning of its component words. However, not all words are equally important for understanding the information the sentence conveys. Additionally, humans tend not to scan through the possible meanings of individual words in order to understand a sentence. Rather, they tend identify important keywords in the sentence and contextualize the concepts expressed by these keywords using their background knowledge. From one perspective, the disclosed implementations attempt to identify for each input statement a subset of terms that capture its important semantic parts and thus, can be used further as building blocks in constructing queries to retrieve documents that tend to support the input statement.

The following discusses algorithms suitable for use with the disclosed implementations. Let:

$$S = w_1 \ldots w_n$$

denote a training statement formed of n words. The rewriting component 206 can perform entity/concept recognition, followed by stopword removal (determiners, conjunctions, prepositions, auxiliary verbs, etc.) and word lemmatization. For annotated corpora that include entity markup or links to an encyclopedic collection (such as Wikipedia), the markup or link information can be preserved while extracting entities and concepts from the remainder of the text. Next, a set of semantic terms $$T_S = \{t_1, \ldots, t_k\}$$

can be extracted from the training statement. The set of semantic terms can include some or all identified/linked entities together with the lemmatized word types corresponding to the remaining words. In some implementations, the lemmatization employs a large English thesaurus that uses regular-expression-based inflection rules to map different word forms to the root of the word lemma, e.g., mapping plural forms of a word to a singular form, etc.

Now, let U denote a reference (e.g., a URL) corresponding to the training statement S, e.g., the URL was used to support the training statement in the annotated corpus. The rewriting component 206 can navigate to U and fetch the referenced supporting document or "target document." For each term t of the training statement S, the rewriting component can compute a number of occurrences in the referenced supporting document. The set of semantic terms that occur at least once will be called the overlapping set:

$$O, O \subseteq T_S$$

This set is also referred to herein as "overlapping terms." For a search engine that uses only the content of the documents indexed by the search engine for retrieval/filtering and that performs regular keyword searches (corresponding to the AND operator of a Boolean search engine), O can be viewed as, e.g., the maximal set of terms from S that can be used to retrieve the target document. Using an additional term from the training statement (which is therefore not in the document) can result in a recall error. Generally, for such a search engine, the more terms from this set that are employed, the smaller the filtered set of documents obtained will be. While this may not guarantee that the position of the target document in the obtained ranked list improves with the addition of new terms from O, there does tend to be a correlation between the number of overlapping terms employed in the query and the document position in the ranked list of search results from such a search engine.

As mentioned above, the rewriting component 206 is configured to transform a statement S into a query Q by selecting semantic terms that are likely to retrieve the target U. More formally, the rewriting component implements a function:

$$g: T_S \rightarrow \{0,1\}^{|S|}$$

that assigns 1 to terms that are likely to be in the target document and 0 to the other terms. Different syntactic, encyclopedic, and heuristic features can be used to select the terms in $T_S$. For example, the features can include the following:

Offset(t, S)—the backward distance (measured in semantic terms) from the end of the statement (the citation marker in the annotated corpus)

TermCount(S)—the number of unique semantic terms

Keyphraseness(t)—Nsd(t)/Ns(t), where Nsd(t) is the # of times t is an overlapping term, Ns(t) is # of statements in which t occurs in training textFreq(t)—the term's frequency in the associated annotated document POS(t, S)—the part-of-speech tag (Penn TreeBank) of the term in the statement TFIDF(t, S)—the product of the term's frequency in the statement and its inverse document frequency derived from large document collections, such as the British National Corpus®, New York Times®, Penn Treebank, etc.

Multiword(t)—a binary value indicating whether semantic term is a multi-word compound word These features can be used with various classification/machine learning algorithms to implement the classification component 207. In one specific implementation, a boosted decision tree classifier is used. To train such a classifier, the value 1 can be assigned to all terms in O and the value 0 can be assigned to all the terms in $T_s \backslash O$ for each training statement, where $T_s \backslash O$ denotes the terms that are in the training statement but not the referenced supporting document. Other suitable machine learning techniques can include logistic regression, averaged perceptron, and support vector machines.

As mentioned above, the classification component 207 can also be trained to select related terms for use in the rewritten queries. In some implementations, each term from the input statement can be transformed into a set of related terms, including synonyms, hyponyms or hypernyms of the original terms of the input statement. The classification component can learn which related terms to use for the rewritten queries.

The learning algorithm can output a probability p(g(t)=1) for each semantic term t ∈ $T_s$. The rewriting component 206 can construct a query Q associated with the input statement S by sorting the terms from $T_S$ in the reverse order of the output probabilities p(g(t)=1), and then by adding to Q terms t from the sorted list as long as p(g(t)=1)≥α and |Q ∪ t|≤γ, where α and γ are model parameters. The values of α can be optimized using:

$$F_\beta = (1+\beta^2)\frac{PR}{\beta^2 P + R}.$$

which represents a weighted harmonic mean of precision and recall. Precision can be computed as the percentage of query terms that belong to O (i.e., correctly classified as occurring in the referenced document), and recall (or sensitivity) as the percentage of semantic terms from O included in the query Q. In some implementations, β can be set to 0.5 to favor precision over recall, since the inclusion of non-overlapping terms is more likely to compromise the retrieval of the supporting document. In some implementations, the value of γ can be set as the average number of overlapping terms between the paired statements and referenced supporting documents from the training statements 204 and the training references 205.

While in some implementations, the terms in the query set are selected in the decreasing order of the probability computed by the classification algorithm, the queries submitted to the search engine 121 can preserve the order of terms from the original training statement. This can help avoid additional noise from term reordering because search engines tend to employ proximity features in their ranking algorithms and their results tend to depend on the term order in the query.

Viewed from one perspective, predicting overlapping semantic terms in the disclosed implementations tends to prefer precision over recall to avoid the use of irrelevant terms in the rewritten query. That said, targeting high precision can lead to constructing very short queries, which lead to rather general searches. For general searches the retrieved documents tend to be relevant to the subject, but may not provide accurate support for the target factual statement.

In view of the above concerns with respect to precision, in some implementations the rewriting component 206 converts the input statement into multiple search queries. Consider a scenario in which the classification algorithm has a precision of P=0.8, which means that 20% of query terms are false positives. In other words, for a hypothetical average query Q of length ten, |Q|=10, two of its terms do not occur in the target document. Without knowing which are those terms, multiple queries can be submitted to the search engine 121. To remove every combination of two terms from the query, this technique runs $(_8^{10})$=45 searches total to submit to the search engine the query of length 8 containing only overlapping terms.

Further implementations use a query modification paradigm where the rewriting component 206 drops at random k semantic terms from the rewritten statement. Here, k is proportional to the false positive error rate. By performing multiple Drop-k search in parallel, the rewriting component can avoid over-specificity of the queries submitted to the search engine. This technique tends to also provide a more "diversified" search process which prevents dead-end scenarios caused by incorporating a non-overlapping term. A specific parallelized Drop-k search is:

Input: Original Query Terms Q={$t_i$|i=1 . . . N}
Input: Query Term Utility L={$l_{t_i}$|i=1 . . . N}
Output: Set of Modified Q={$Q'_i$|$Q'_i$ ⊂ Q, i=1 . . . N}
Output: Set of N Search Results={$R'_i$|i=1 . . . N}

---

Determine k
1:    Compute average precision P of all Qi, such that ‖$Q_i$‖ = N, using development dataset
2:    Number of terms to drop, k = ⌈N(1 − P)⌉
Tagging $t_i$ with probabilities
1:
$$\text{Compute } S = \sum_{i=1}^{N} l_{t_i}$$

2:    Compute P = {$p_i$|p = 1 . . N}, where $p_i$ = $l_{t_i}$/S
Constructing N Query Sets
1:    for i = 1 to N do
2:       $Q'_i$ = { }
3:       for 1 to k do
4:          Randomly pick a term t from Q according to P, such that t ∈ Q but t ∉ $Q'_i$ 5:          $Q'_i$ = Q − {t}
6:       end for
7:    end for
N Parallel Search
1:    for i = 1 to N in parallel do
2:       $R'_i$ = Search($Q'_i$)
3:    end for

---

In some implementations, the rewriting component 206 can also use topic modeling. Some topic modeling algorithms use a utility function to discriminate against query terms that are likely to be non-overlapping. Specifically, the utility function can compute the inverse of a measure of plausibility of a term to be included in the query. It can be desirable to include numerical values (e.g., "1.2%" and "$12 mil.") and topic-specific terms (e.g., "election day"). The Pachinko allocation model (PAM) can be used to model the topics in a text, where keywords forming the dominant topic are assumed as a set of annotation keywords. The Pachinko allocation model can capture correlations between all the topic pairs using a directed acyclic graph (DAG). This model also supports finer-grained topic modeling, and it has state-of-the-art performance on the tasks of document classification and topical coherence of keyword sets. Given a statement, the rewriting component uses the PAM to infer a list of super-topics and sub-topics together with words weighted according to the likelihood that they belong to each of these topics. Each term is assigned a score given by:

$$\text{Score}(t_i) = \sum_{j \in sup-topics} p_s^j p_j(t_i) + \sum_{k \in sub-topics} p_s^k p_k(t_i)$$

where $p_s^j$ is the inferred probability that topic j is exhibited in a statement S, while $p_j(t_i)$ is the probability of generating term $t_i$ given the topic j. Additionally, the utility for each semantic term $t_i$ in S can be computed as:

$$l_{t_i} = \frac{1}{\text{Score}(t_i)} \sum_{j \in s} \text{Score}(t_j)$$

In essence, super-topics provide a coarse-grain topical gist of the statement, while sub-topics further enhance the description with fine-grain topical variation. For example, 50 super-topics and 100 subtopics can be used as operating parameters for PAM, since these values tend to provide good results for topic modeling. The model includes several other parameters whose values can be determined empirically on the training statements 204 and the training references 205. These parameters can include the randomization seed, the Dirichlet prior for sampling multinomial distribution for sub-topics, and the number of samples to be drawn from the topic distributions.

As mentioned, some implementations use uniform versions of Drop-k, in which the discarded terms are selected uniformly at random rather than based on the induced topic models. Other implementations use Drop-k with PAM topic modeling. In some cases, introducing PAM modeling with Drop-K can improve document retrieval performance.

Re-Ranking

The following section discusses some implementations of the re-ranking component 208 in more detail. Generally, the re-ranking component re-ranks the results of one or more queries that are generated for a given statement using one or more ranking features. Some implementations use a re-ranking paradigm that employs several similarity measures between the input statement and the retrieved documents. For each unique document d in the combined set of N ranked list of candidate supporting documents for the input statement, the re-ranking component can compute, e.g., the best rank of d in any of the lists as minRank(d). The ranking score of the document d can be computed as:

$$Score(d) = \frac{1}{minRank(d)} \cdot \prod_j h_j(d)$$

and the re-ranking component can re-rank retrieved documents by sorting them in the decreasing order of their ranking scores.

In the equation above, $h_j(\cdot)$ are ranking features, e.g., heuristic measures of similarity between documents and the input statement. Some implementations use the cosine similarity metric, which quantifies the degree of lexical overlap between the input statement and the retrieved documents normalized by their lengths. To measure the similarity between the input statement and the retrieved documents on a semantic level, some implementations also employ Latent Semantic Analysis (LSA). LSA can quantify the relatedness between the input statement and each of the documents retrieved by the search using second-order co-occurrence statistics of semantic terms between the two. Note that, by employing both of these heuristics simultaneously, documents which are semantically and lexically similar to the input statement tend to be promoted to the top of the ranking. This, then, can discover supporting references that qualify as alternatives to the references provided in the annotated corpus.

As a third ranking feature, a web page ranking algorithm such as the PageRank® algorithm can be employed to create a re-ranked order among references with discrimination for trustworthiness and reliability. PageRank® can capitalize on the hyperlink structure of the Web to provide a "recommendation system" in which a document having a higher PageRank® score possesses more incoming recommendations than those with lower PageRank® scores. Thus, the document with the higher PageRank® score may be perceived as being more authoritative and trustworthy with respect to its information content. Given two documents with the same minRank, promoting the document with a higher PageRank® score aligns some policies for selecting reliable and trustworthy sources as citations (e.g., Wikipedia®). As mentioned above with respect to block 506 of method 500, other ranking features can also be used.

Some trustworthiness ranking features may take into account domain names, e.g., some domain names may be deemed more trustworthy than other domain names. For example, the official ABC University web site may be at the "www.abcuniversity.edu," and considered relatively trustworthy. Conversely, an unofficial alumni network domain, "www.AbcAlums.net" may be considered relatively less trustworthy. Some implementations may restrict the results to certain domain names, e.g., results from domains having low trustworthiness can be discarded as part of the re-ranking.

Relatively lightweight implementations of cosine similarity, LSA and PageRank® can be employed to avoid significant overheads in the re-ranking phase. The component ranking features can be normalized, e.g., on a 0-1 scale before integrating them into the re-ranking formula. Re-ranking can be particularly useful for implementations that generate multiple queries from an input statement, e.g., Drop-k PAM parallel implementations. An exemplary ranking function using cosine similarity and PageRank® is as follows:

$$Rank(d) = \frac{1}{minRank(d)} \cdot Cosine(d, S) \cdot PageRank(d)$$

Note also that the discussion above focuses on reranking the retrieved documents as a whole. Some implementations, however, may partition retrieved documents into parts that focus on the subject of the user query and parts that do not focus on the subject of the user query. The user can be directed to the parts of the documents that focus on the subject of their queries, e.g., by identifying these parts of the documents in the re-ranked search results provided to the user.

Example Interface

FIG. 6 illustrates an exemplary interface 600 to the search engine 121 (FIG. 1) that is suitable in some implementations. The search engine can be configured to generate interface 600 and send the interface to the client device for display in the browser. A user of the client device can enter a search query into search field 601 in order to execute a search. The client device can send the search query to the search engine, which in turn can search for results that match the search query. In some implementations, the search engine can be configured to automatically determine whether the search query is a statement suitable for processing by the verification engine 122. If so, the search engine can use the techniques discussed above to generate search results responsive to the statement. In other implementations, the interface is available at a URL that is specifically for interfacing to the verification engine, in this example, the URL http://www.123searchengine.com/factcheck. This can be a convenient arrangement for interfacing to a search engine that is not configured to detect whether received queries are in the form of a statement.

In the example shown in FIG. 6, the user has entered the search query 601 in the form of the statement "John Robinson attended college at XYZ University." The search engine 121 and the verification engine 122 have performed processing such as discussed above with respect to method 500, and three search results 602, 603, and 604 have been returned to the client. Each search result can include a title, e.g., "1992 Graduates of XYZ," a snippet, e.g., "Robinson, John R., B S, Mechanical Engineering," and a URL, e.g., a link to a web document such as "www.xyzuniversity.edu/graduating_classes/92."

Note that the first result returned by the verification engine 122 in FIG. 6 is a graduating class roster for the school listed in the query, e.g., at the domain name of the school. Intuitively, one way to view the training of the verification engine is as follows. Assume that the annotated documents 131 frequently use graduating class rosters to support statements about where an individual graduated from college. Then the verification engine can learn that, for an input statement indicating that a particular individual went to a particular school, a good query may return a supporting document such as an alumni class roster, e.g., from that particular school's domain name.

FIG. 7 illustrates an alternative implementation with an interface 700. Generally speaking, interface 700 can be similar to interface 600 as set forth above. However, interface 700 also shows search results that contradict the statement. Specifically, results 701 and 702 are two contradicting search results that were also retrieved by the verification engine 122. In this example, the contradicting documents are from a talk forum and a blog, respectively. Furthermore, the two snippets "i thought . . . " and "Comment 42 . . . " are both phrased in a way that makes the statement seem somewhat unsure. Thus, a user of interface 700 can compare relatively quickly (1) the sources and (2) the snippets of the supporting results 602, 603, and 604 to the sources and snippets of the contradicting results to make a quick determination of how confident they are in the statement. Moreover, the user can also quickly determine how many existing documents seem to support the statement, and how many existing documents seem to contradict the statement.

In this case, it seems likely the user would conclude the statement is probably true. Particularly, the supporting results come from relatively more authoritative sources than the contradicting results, e.g., the university graduating roster, an online encyclopedia, and a biographical website for the supporting documents vs. a forum and a blog comment for the contradicting results. Furthermore, the snippets themselves shown in the supporting results each include a fairly clear statement that John Robinson did attend college at XYZ. Conversely, the snippets in the contradicting statements are less firm, and most users would probably afford these snippets less credibility than the statements in the supporting documents.

Note that the disclosed implementations of an interface to the search engine 121 are but one of many suitable interfaces to allow users to use the verification engine 122. As another example, consider a document such as a word processing document. Users editing or reading such a document could be presented with an interface within the word processing program to launch a search for supporting/contradicting results for statements in the document. For example, the user could highlight a statement and right-click to send the highlighted statement to the verification engine for processing. The results could be presented externally, e.g., within the web browser, or internally within the word processing program. This is also true for other types of programs that handle text, e.g., spreadsheets, portable document format (.pdf), postscript, etc.

Applications

One contemplated application of the disclosed techniques involves improving annotations for some annotated corpora. For example, an online encyclopedia may encourage or require contributors to provide reliable sources for the edited content, particularly for factual statements of controversial nature. This presents an opportunity to use existing citations as labeled data for the implementations discussed above. Furthermore, the disclosed implementations can be used by content contributors to uncover additional citations. This can mean both (1) adding new annotations to new or existing articles to support statements included therein, and (2) replacing or supplementing existing citations with citations uncovered using the disclosed implementations. More generally, the disclosed implementations provide opportunities for continued refinement of annotated corpora to include appropriate annotations therein. As the annotation quality of a given annotated corpus improves, this can also tend to improve the effectiveness of a verification engine that uses the annotated corpus for training purposes.

Also note that, in some circumstances, the supporting and contradicting search results may be relatively equally balanced. For example there may be plentiful supporting and contradicting evidence in the search results provided by the verification engine. In such circumstances, it can still be useful to the user to know that there is ample supporting and contradicting evidence. For example, supporting evidence for a particular statement could tend to "drown out" contradicting evidence in a conventional search engine simply because most major news sources, government entities, etc. are consistently reporting a particular viewpoint. By identifying contradictory evidence for such a statement and bringing the contradictory evidence to the user's attention, the user can obtain contradictory evidence even where traditional sources do not provide much contradictory evidence. Thus, the user make a more informed decision about the truthfulness of the statement.

CONCLUSION

Using the described implementations, input statements can be rewritten to obtain search results that tend to support or contradict the input statements. For example, the rewritten input statements can be used to query a search engine and receive results from the search engine. The results can be re-ranked based on similarity of the search results to the input statements, e.g., instead of similarity to the queries that were used to retrieve the search results.

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one computing device, the method comprising:
   training a classifier to classify terms of input statements using training data, the training data including training statements having corresponding training references, wherein the training references identify supporting documents that support the training statements or contradictory documents that contradict the training statements;
   receiving a first input statement, the first input statement comprising a plurality of first terms;
   rewriting the first input statement to obtain one or more queries by classifying the first terms of the first input statement using the trained classifier; and
   using the one or more queries to obtain search results for the first input statement.

2. The method according to claim 1, wherein:
   an individual query obtained by rewriting the first input statement comprises less than all of the first terms of the first input statement and
   another individual query obtained by rewriting the first input statement comprises one or more related terms that are each related to corresponding first terms of the input statement.

3. The method according to claim 2, further comprising:
   ranking the search results and providing the ranked search results in response to the first input statement.

4. The method according to claim 3, further comprising retrieving the supporting documents using uniform resource locators (URLs) included in the training references.

5. The method according to claim 1, wherein the training statements comprise training statement terms, the training references comprise training reference terms, and the training comprises assigning first numerical values to overlapping training statement terms that occur in corresponding training references and second numerical values to non-overlapping training statement terms that do not occur in the corresponding training references.

6. The method according to claim 5, further comprising determining features for the overlapping training statement terms and using the features to train the classifier.

7. The method according to claim 5, wherein the classifier is a boosted decision tree classifier.

8. A system comprising:
a verification engine; and
one or more processing devices configured to execute the verification engine,
wherein the verification engine is configured to receive an input statement and output a query,
the verification engine comprising:
training data comprising training statements and training references, the training references identifying supporting documents for the training statements,
a classification component configured to learn, from the training statements and the supporting documents for the training statements, a function that assigns values to terms of the input statement, and
a rewriting component configured to rewrite the input statement based on the values assigned to the terms to obtain the query.

9. The system according to claim 8, wherein the rewriting component is configured to drop some individual terms of the input statement based on the values.

10. The system according to claim 8, further comprising a search engine configured to execute the query and provide results to the verification engine.

11. The system according to claim 10, embodied as a single computing device comprising both the search engine and the verification engine.

12. The system according to claim 10, wherein the search engine and the verification engine are embodied on different computing devices.

13. The system according to claim 8, wherein the training references comprise endnotes or footnotes identifying the supporting documents.

14. One or more computer-readable storage media comprising instructions which, when executed by one or more processing devices, cause the one or more processing devices to perform acts comprising:

obtaining a plurality of annotated documents;
extracting training data from the plurality of annotated documents, the training data comprising training statements and training references that identify supporting documents or contradictory documents for the training statements;
training a classifier to perform term evaluation using the training data;
receiving an input statement comprising a plurality of terms;
rewriting the input statement into at least one query comprising individual terms from the input statement or related terms that are related to the individual terms of the input statement by evaluating the plurality of terms of the input statement using the trained classifier;
querying a search engine with the at least one query to obtain a plurality of search results identifying candidate supporting documents for the input statement;
re-ranking the plurality of search results based on one or more ranking features; and
providing the re-ranked search results in response to the input statement.

15. The one or more computer-readable storage media of claim 14, wherein the one or more ranking features comprise a similarity measure and a trustworthiness measure.

16. The one or more computer-readable storage media of claim 15, wherein the acts further comprise normalizing the one or more ranking features and combining the normalized ranking features in a ranking function used for the re-ranking.

17. The one or more computer-readable storage media of claim 15, wherein the one or more ranking features comprise a cosine similarity measure and a web page ranking measure.

18. The one or more computer-readable storage media of claim 14, the acts further comprising providing an interface that receives the input statement and outputs the re-ranked search results.

19. The one or more computer-readable storage media of claim 18, wherein the interface also outputs additional search results that contradict the input statement.

20. The one or more computer-readable storage media of claim 14, wherein at least some of the annotated documents are obtained from an online encyclopedia.

* * * * *